United States Patent [19]
Riza

[11] Patent Number: 6,031,658
[45] Date of Patent: Feb. 29, 2000

[54] DIGITAL CONTROL POLARIZATION BASED OPTICAL SCANNER

[75] Inventor: Nabeel A. Riza, Orlando, Fla.

[73] Assignee: University of Central Florida, Orlando, Fla.

[21] Appl. No.: 09/160,886

[22] Filed: Sep. 25, 1998

[51] Int. Cl.[7] .................................................. G02B 26/08
[52] U.S. Cl. ........................ 359/301; 359/298; 359/237; 359/315; 349/196; 385/37
[58] Field of Search .................................. 349/196, 202; 385/37; 359/298, 299, 300, 303, 304, 315, 322–323, 301

[56] References Cited

U.S. PATENT DOCUMENTS

| | | | |
|---|---|---|---|
| 4,706,094 | 11/1987 | Kubick | 343/754 |
| 5,231,405 | 7/1993 | Riza | 342/375 |
| 5,471,343 | 11/1995 | Takasugi | 359/494 |
| 5,477,383 | 12/1995 | Jain | 359/565 |
| 5,568,286 | 10/1996 | Riza | 359/53 |
| 5,594,565 | 1/1997 | DeJule et al. | 349/19 |
| 5,668,657 | 9/1997 | Talbot | 359/315 |
| 5,682,214 | 10/1997 | Amako et al. | 349/74 |
| 5,715,029 | 2/1998 | Fergason | 349/196 |
| 5,718,226 | 2/1998 | Riza | 128/660.01 |
| 5,729,239 | 3/1998 | Rao | 343/753 |
| 5,731,790 | 3/1998 | Riza | 342/368 |
| 5,854,613 | 12/1998 | Solton et al. | 345/42 |

OTHER PUBLICATIONS

R.W. Cohn, "Real–Time Multi–Spot Beam Stearing with Electrically Controlled Spatial Light Modulators" in Optical Scanning Systems: Design and Applications, Leo Beiser, Stephen Sagan, Editors, Proceedings of SPIE, vol. 3131, 145–155, Jul. 1997.

J.M. Finlan et al., "Nonmechanical Beam Steering Using Spatial Multiplexing" in Optical Scanning Systems: Design and Applications, Leo Beiser, Stephen Sagan, Editors, Proceedings of SPIE, vol. 3131, 156–164, Jul. 1997.

J.A. Thomas et al., A PLZT–Based Dynamic Diffractive Optical Element for High–Speed Random–Access Beam Stearing in Optical Scanning Systems: Design and Applications, Leo Beiser, Stephen Sagan, Editors, Proceedings of SPIE, vol. 3131, 145–155, Jul. 1997.

Domash, L.H., Chen, Y.M., Gomatam, B. Gozewski, C., Sutherland, R.L., Natarajan, L.V., Tondiglia, Bunning, T.J., and Adams, W.W., "Switchable–focus lenses in holographic polymer dispersed liquid crystals," *SPIE Proc.*, vol. 2689, pp. 188–194, 1996.

(List continued on next page.)

*Primary Examiner*—Georgia Epps
*Assistant Examiner*—David N. Spector
*Attorney, Agent, or Firm*—Brian S. Steinberger; Law Offices of Brian S. Steinberger

[57] ABSTRACT

High speed low cost billion point optical scanner using a binary optical polarization sensitive cascaded architecture network having binary switchable optical plates for scanning in one dimension(x-direction), two dimensions(x and y directions) and three dimensions(x, y and z directions). The scanner has a fast microsecond beam switching speed and low control power and realizes high space bandwidth products of up to one billion points using minimum control signals and hardware. The binary switching optical plates are modules for the x, y, and z directions. For each of the directions, each module contains an active polarization switches and passive beam steering devices. The switches can be high speed flat panel thin film polarization switches such as ferroelectric liquid crystal devices or multiple quantum well binary polarization rotation devices or nematic liquid crystal(NLC) polarization rotator devices. The beam steering devices can be birefringent plates such as birefringent mode nematic liquid crystals(BM-NLC), diffractive optical elements(DOEs), polymer dispensed liquid crystals (PDLCs), and computer generated birefringent nanosecond fabricated structures.

20 Claims, 7 Drawing Sheets

OTHER PUBLICATIONS

Francis, D.A., Kiang, M.H., Solgaard, O., Lau, K.Y., Muller, R.S., and Chang–Hasnain, C.J., "Compact 2–D laser beam scanner with fan laser array and Si micromachined microscanner," *IEE Electronics Letters,* vol. 33 No. 13, pp. 1143–1145, Jun. 19, 1997.

Lewotsky, K., "Dynamic diffractive optic redirects beam," *World News,* Laser Focus World, pp. 56–60, Aug. 1997.

Liu, L., and Li, Y., "Free Space optical shuffle implementations by use of birefringence–customized modular optics," *Applied Optics,* vol. 36 No. 17, pp. 3854–3865, Jun. 10, 1997.

Riza, N.A., BOPSCAN Technology: A methodology and implementation of the billion point optical scanner OSA Topical Meeting, International Optical Design Conference, *SPIE Proc.,*3482, Jun. 1998.

Soltan, P., and Lasher, M., "Non–Moving 3D Volumetric Displays using Upconversion Materials," *Progress Report,* ONR Code 351, Oct. 31, 1997.

Stone, T.W., and Battiato, J.M., "Optical array generation and interconnection using birefringent slabs," *Applied Optics,* vol. 33 No. 2, pp. 182–191, Jan. 10, 1994.

Xu, F., Ford, J.E., and Fainman, Y., "Polarization selective computer generated holograms, design fabrication, and applications," *Applied Optics,* vol. 34 No. 2, pp. 256–266, Jan. 10, 1995.

F1a, F1b, F1c: Same as F1x, F1y, F1z: Fast Binary 90° Polarization Rotators

Pa, Pb, Pc: Fixed High Extinction Ratio Polarizers

N1x: X-scan birefringent plate

N1y: Y-scan birefringent plate

N1z: Z-scan birefringent plate

DIGITAL CONTROL POLARIZATION BASED OPTICAL SCANNER

This invention relates to optical scanners, and in particular to a three dimensional reversible polarization based optical scanner having optically birefringent beam forming plates and binary polarization switches. The plates and switches can each be less than approximately 2 mm thick, within thin film optics such as polymer dispersed liquid crystals (PDLC), nematic liquid crystals, ferroelectric liquid crystals, computer generated nanostructure holograms, polymer films, multiple quantum well devices, photo thermal reflective glasses, and the like.

BACKGROUND AND PRIOR ART

A non-mechanical inertialess optical scanner is a critical building block in numerous optical applications ranging from laser communications, optical switching, model reconstruction, optical storage, and displays. Scanners need to be able to operate in one dimension (1-D), two dimensions (2-D), or three dimensions (3-D). The application requirements for an inertialess optical scanner, the high beam setting speed (e.g., in microseconds), a large number of scan beams, and simplicity in control electronics, are very attractive features for a scanner.

Three main approaches have evolved to form 1-D and 2-D type random access inertialess scanners. One approach uses two 1-D acousto-optic deflectors(AODs) or two 1-D electro-optic deflectors in cascade to form a beam that can scan in 2-D. See M. Gottleib, C. L. M. Ireland and J. M. Ley, "Electro-Optic and Acousto-Optic Scanning and Deflection," Marcel Dekker, 1983.

These approaches have the features of microsecond regime beam reset times and a moderately high, (i.e. 400× 400 for the AOD-based scanner) scan spots. The limitations of these approaches include low (i.e. 20%) optical throughput efficiency, watt level high power and cost, radio frequency (RF) drive electronics, and limited beam acceptance aperture size(i.e. 1 cm×1 cm) for the scanner.

The second approach is via two large area multi-pixel birefringent-mode nematic liquid crystal devices (BM-NLC) that exhibit a highly desirable longitudinal electro-optical (EO) effect. See P. F. McManamon, T. A. Dorschner, D. L. Corkum, L. J. Friedman, D. S. Hobbs, M. Holz, S. Liberman, H. Q. Nguyen, D. P. Resler, R. C. Sharp, and E. A. Watson, "Optical Phased Array Technology," Proc. IEEE, Vol.84, pp. 268–298, Feb. 1996. This approach includes larger scan beam aperture size (i.e. 10 cm×10 cm) and the high degree of wave front programmability, both due to the large area, very large pixel count (i.e. million), design of NLC device technology. The limitations of this approach include the slow several milliseconds beam reset time due to the NLC devices, and the cost and complexity of the NLC million pixel drive electronics that includes a personal computer. Speed improvements can be made using a faster response EO material such as lead lantanum zirconate (PLZT), although at the cost of using high voltage (i.e. 400 Volts) control electronics and high complexity onchip electrodes due to the transverse EO effect exhibited by PLZT. Another problem associated with theses NLC/PLZT scanner devices is that an N-point 1-D deflection requires an N-pixel 1-D device that is driven by N independent electrodes with N independent voltage levels. Hence, as N gets large, e.g. 1000, the electronics get bigger and more costly.

An approach to solving the multi-signal drive problem was the use of an on-chip hardwired resistor network that formed a three terminal device. See N. A. Riza and M. C. DeJule, "Three terminal adaptive nematic liquid crystal lens device," Optics Letters, Vol. 19 No. 14, pp. 1013–15, July, 1994. In this case, for an NLC device, a simple variation of a single low voltage (1–3V) device drive signal allowed the device to step through its various beam forming settings. Another limitation of this approach is due to its hardwired device control structure, as it takes away almost all the degrees of freedom available in a multipixel drive device. Hence, if total programming flexibility is required, the on-chip hardwired approach is not suitable. A compromising approach recently proposed using PLZT devices is to use two independently driven 1-D scan devices. See J. A. Thomas, M. E. Lasher, Y. Fairman, P. Soltan, "PLZT-based dynamic diffractive optical element for high speed random access beam steering," SPIE Proc., Vol. 3131, No 13. Jul. 27–Aug., 1997. In other words, two 32 electrode devices placed in cascade can provide 32×32 or 1024 scan spots, then we only need to control 64 voltage levels, not 1024 voltage levels, as previously needed in a single multi-pixel drive 1-D scanner device. The group has proposed forming a 2-D scanner, by orthogonally placing the x and y-direction PLZT deflector devices in a cascaded geometry. Hence, for a 1024×1024 point 2-D scan, four PLZT 32-electrode drive signal devices are needed that require 128 independently controlled voltage levels. Although this approach has its advantages in terms of reduction in number of scanner control signals, the complexity of the proposed PLZT devices in terms of device parameters such as a demanding electrode design for a transverse EO effect material, high voltage (e.g., 100 V) drive signals, and limitations in a device optically active area, impose key restrictions towards achieving a low cost high speed 2-D scanner.

The third most recent approach for forming a 1-D or 2-D scanner is by using tiny micro mirror devices. See D. A. Francis, M. H. Kiang, O. Solgaard, K. Y. Lau, R. S. Muller, and C. J. Chang-Hasnain, "Compact 2-D laser beam scanner with fan laser array and Si micromachined microscanner," IEE Electronics Letters, Vol. 33, No. 13, Jun. 19, 1997.

The key limitation of these micro mirror approaches is their non-solid state nature, leading to moving parts with critical wear and tear and reliability issues.

Because theses spinning optics are bulky and slow, present 3-D scan systems are not completely solid-state and inertialess and cannot implement rapid 3-D scans. Hence, the ultimate goal of the scanner industry is to realize a low cost, 3-D inertialess, low control power scanner that can rapidly and efficiently scan a volume with 1000×1000×1000 or a billion points. All the previously mentioned scanner approaches can provide only 1-D or 2-D scan control capabilities. To provide the more demanding and useful 3-D scan, attempts have been made to combine these 1-D and 2-D scan devices with mechanically spinning optics such as polygons. See L. Beiser and R. Barry Johnson, "Scanners," Ch. 19, Handbook of Optics, Vol.II, Ed., M. Bass, pp. 19.1–19.57, McGraw Hill, 2nd Edition, 1995. This also means that such a scanner must have a billion degrees of freedom, a non-trivial task from a device control point of view.

The subject inventor has developed such a 3-D scanner based on simple digital control and binary properties of polarization based thin-film optics. See N. A. Riza, "High speed inertialess ultra-high space bandwidth product optical scanners using planar polarization optical devices," ARO True 3-D Displays Workshop Presentation, Orlando, Fla., Dec. 11, 1997; and N. A. Riza, "BOPSCAN Technology: A methodology and implementation of the billion point optical scanner," OSA Topical Meeting, International Optical Design Conference, *SPIE Proc.* 3482, June 1998. To the best of the inventor's knowledge, no other device is known for adequately solving the problems presented above. Birefringent optics, particularly bulk crystals, have been around for many years and various polarization-based switching systems have been implemented. See L. Liu and Yao Li, "Free Space optical shuffle implementations by use of birefringence-customized modular optics," *Applied Optics*, Vol. 36, No. 17, Jun. 10, 1997; F. Xu, J. E. Ford, and Y. Fainman, "Polarization selective computer generated holograms: design fabrication, and applications," *Applied Optics*, Vol. 34, No. 2, Jan. 10, 1995; T. W. Stone and J. M. Battiato, "Optical array generation and interconnection using birefringent slabs," *Applied Optics*, Vol 33 No. 2, Jan. 10, 1994; N. A. Riza, "Polarization based fiber-optic delay lines," SPIE Proc. Vol. 2560, p. 120–129, July 1995; and L. H. Domash, Y. M. Chew, B. Gomatam, C. Gozewski, R. L. Sutherland, L. V. Natarajan, V. P. Tondiglia, T. J. Bunning, and W. W. Adams, "Switchable-focus lenses in holographic polymer dispersed liquid crystals,"*SPIE Proc.*, Vol. 2689, PP. 188–194, 1996. See T. W. Stone, M. S. Malcuit, J. A. Kleinfield, and J. Kralik, "Micro-optic photonic time shifters based on switched gratings," *SPIE Proc.* Vol. 3160, pp. 17–26, 1997; and K. Noguchi, "Optical free-space multi-channel switches composed of Liquid Crystal Light Modulator Arrays and birefringent crystals," *IEEE Journal of Lightwave Tech.*, Vol. 16, No. 8, Aug. 1998.

However, no polarization-based system using birefringent optics and digital control has been proposed for inertialess motion or scanning of light in full 3-D. The proposed invention deals with the inertialess 3-D scanner that takes advantage of polarization sensitive thin film optics to form a compact LEGO style planar stacked low control power, reversible, broad optical wavelength band, digitally controlled structure for high spaced bandwidth products (SBWP) scanning.

SUMMARY OF THE INVENTION

The first objective of the present invention is to provide a fast microsecond or better regime beam switching speed and low control power (e.g. milliwatts) optical scanner.

The second object of this invention is to provide a binary switched optical scanner to realize high space bandwidth products (SBWPs of one billion points) using minimum control signals and hardware.

The third object of this invention is to provide an independent optical beamforming system with separation of scan dimensions for volumetric scans.

The fourth object of this invention is to use high speed (microsecond domain or better) flat-panel thin film polarization switches such as ferroelectric liquid crystal devices or nanosecond switching speed multiple quantum well (MQW) binary polarization rotation devices in an optical scanner.

The fifth object of this invention is to use passive high efficiency, high resolution, optically birefringent plates for high accuracy optical wavefront control.

The sixth object of this invention is to use slowly programmable high efficiency, high resolution, optically birefringent plates for additional high accuracy cascaded optical wavefront control. "Slowly programmable" is relative to the fast microseconds or faster switching binary polarization switching devices.

The seventh object of this invention is to provide a high speed inertialess reverse optical scanning system having microsecond domain to ultra-fast nanosecond domain random access beam reset times.

The eighth object of this invention is to provide an optical scanning system having a broad band optical wavelength design as a low optical loss for a given scanner space bandwidth product (SBWP). An example of "low optical loss would be less than 6 d B (or less than 25% throughput) for a 64×64×64 pt SBWP scanner.

The ninth object of this invention is to provide an optical scanning system having low electrical control power requirements in a few tens of milliwatts for a high (more than one million point) SBWP scanner.

The tenth object of this invention is to provide an ultra high space bandwidth product system in one Dimension of 1000 points.

The eleventh object of this invention is to provide an ultra high space bandwidth product system in two Dimensions of 1000×1000 points.

The twelfth object of this invention is to provide an ultra high space bandwidth product system in three Dimensions of 1000×1000×1000 points for one billion points.

The thirteenth object of this invention is to provide plug-in/plug-out programmable beamforming optics using birefringent plates such as BM-NLC (birefringent mode nemetric liquid crystals) devices, DOEs (diffractive optical elements), PDLCs (polymer dispensed liquid crystals), polymer film (e.g. Polaroid DMP-128 Polymer Holographic plate) and computer generated birefringent nanoscale fabricated structures.

The fourteenth object of this invention is to provide a polarization-based scanner with a polarization insensitive mode using polarization diversity techniques.

The fifteenth object of this invention is to provide an optical scanner which uses a polarization noise rejection method involving fixed polarizers and switched polarization rotators to give high signal-to-noise ratios.

The sixteenth object of this invention is to provide an optical scanning system with planar device technology which allows for extensions to parallel/multichannel scanner systems.

The seventeenth object of this invention is to provide an application example of a multiple port fiber-optic switching system using the 3-D scanner The eighteenth object of this invention is to provide multiple simultaneous beam scanning capabilities via multi-drive signals to the scanner. More than one beam can be scanned simultaneously using the same scanner.

Preferred embodiments of the invention are for one dimensional scan, two dimensional scan, and three dimensional scan applications.

The first version of the non-mechanical 1D(one-dimensional) inertialess optical scanner that can rapidly and efficiently scan a volume spacing of approximately 1 (one) thousand points includes a linearly polarized light source for optically scanning an optical field with the light source in the x-direction with binary switchable cascaded control modules. Each of the modules includes a control means having binary switchable cascaded N-bit modules for controlling the optical scanning of the optical field in a x direction, wherein the control means scan approximately a thousand points.

The second version of the non-mechanical 2D(two-dimensional) inertialess optical scanner that can rapidly and efficiently scan a volume spacing of approximately 1(one) million points includes a linearly polarized light source for optically scanning an optical field with the light source in two(x and y) directions using binary switchable cascaded control modules. Each of these modules includes a first control means having binary switchable cascaded N-bit modules for controlling the optical scanning of the optical field in a x direction, and a second control means having a binary switchable cascaded N-bit modules for controlling the optical scanning of the optical field in a y direction, wherein the first control means and the second control means scan approximately a million points.

A version of the non-mechanical 3D(three-dimensional) inertialess optical scanner that can rapidly and efficiently scan a volume spacing of approximately 1(one) billion points includes a linearly polarized light source for optically scanning an optical field with the light source in three(x,y and z) directions using binary switchable cascaded control modules. Each of the modules includes a first control means having binary switchable cascaded N-bit modules for controlling the optical scanning of the optical field in a x direction, a second control means having a binary switchable cascaded N-bit modules for controlling the optical scanning of the optical field in a y direction, a third control means having a binary switchable cascaded N-bit modules for controlling the optical scanning of the optical field in a z direction, wherein the first control means, the second control means and the third control means scan approximately a billion points.

Each switching module includes an active polarization rotator switch and a passive beam steering device for each of the x direction, the y-direction, and the z-direction. The active polarization rotator switch can include ferroelectric liquid crystal(FLC) polarization rotators, multiple quantum well(mqw) polarization rotators and nematic liquid crystal (NLC) polarization rotators. The passive beam steering device can include birefringent plates, such as a birefringent mode nematic liquid crystals(BM-NLC), diffractive optical elements(DOEs), polymer dispensed liquid crystals(PDLCs) and computer generated birefringent nanoscale fabricated structures.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The subject inventor has described a solution for achieving this billion points scanner. See N. A. Riza, "BOPSCAN Technology: A methodology and implementation of the billion point optical scanner," OSA Topical Meeting, International Optical Design Conference, *SPIE Proc.* 3482, June 1998. The approach is to use planar active (electronically programmable) and passive thin-film polarization sensitive optics in a compact LEGO-like stacking or cascaded binary switching architecture to form the desired 3-D scanner. The approach is entitled BOPSCAN Technology: *Binary Optical Polarization Sensitive Cascaded Architecture Network Technology*. Our non-mechanical optical scanner features include microsecond regime or better beam reset times, low (e.g. mW levels) control power and low complexity drive electronics, large (several cms) or small (few hundred microns) scan beam active aperture sizes, very large number of scan beams (over a billion), very few control signals (e.g. only 30 signals for a billion point scan), high throughput efficiency (e.g., 50%), and most importantly, potential for low cost.

First we describe the basic philosophy to solve for the billion point scanner problem. To scan in 3-D space ( (x,y,z) Cartesian coordinate space), we separate the 3-D beam control problem into three independent scanner control signal dimensions. In other words, we will independently control three separate scanners, one for the x, one for the y, and one for the z-scan direction. For the simple case where we need K scan points per Cartesian dimension, or $K^3$ total scan points (voxels), we need a control structure per dimension that efficiently produces K scanned beam points. Our approach is to use the a binary switched cascaded N-bit control structure where switching the N binary optical control modules results in $2^N$ optical states for the scanner. As there are three independent optical control structures for the x,y and z scan directions, this results in a total $2^N \times 2^N \times 2^N$ optical states for our scanner. Hence, as our goal is a billion point scanner, N=10 bits achieves this goal. In effect, we control only 3N or 30 binary optical switching modules to get a billion degrees of control, a far cry from other optical scan control methods.

As we have solved the billion degrees of freedom control problems, the next question is what optical implementation fits the key scanner specifications such as a binary cascaded structure, low control power consumption, and fast microsecond domain or better switching speed. Our approach is to utilize the high speed binary switching nature of thin-film active polarization optics (hence the binary control structure) in cascade with passive or slowly programmable polarization sensitive optics such as birefringent plates. "Passive" refers to plates which are fixed or without electrical controls. "Active" refers to plates with electrical control to change their phase front profiles. "Slowly programmable" refers to several millisecond domain response time devices.

Figures 1A, 1B, 1C:
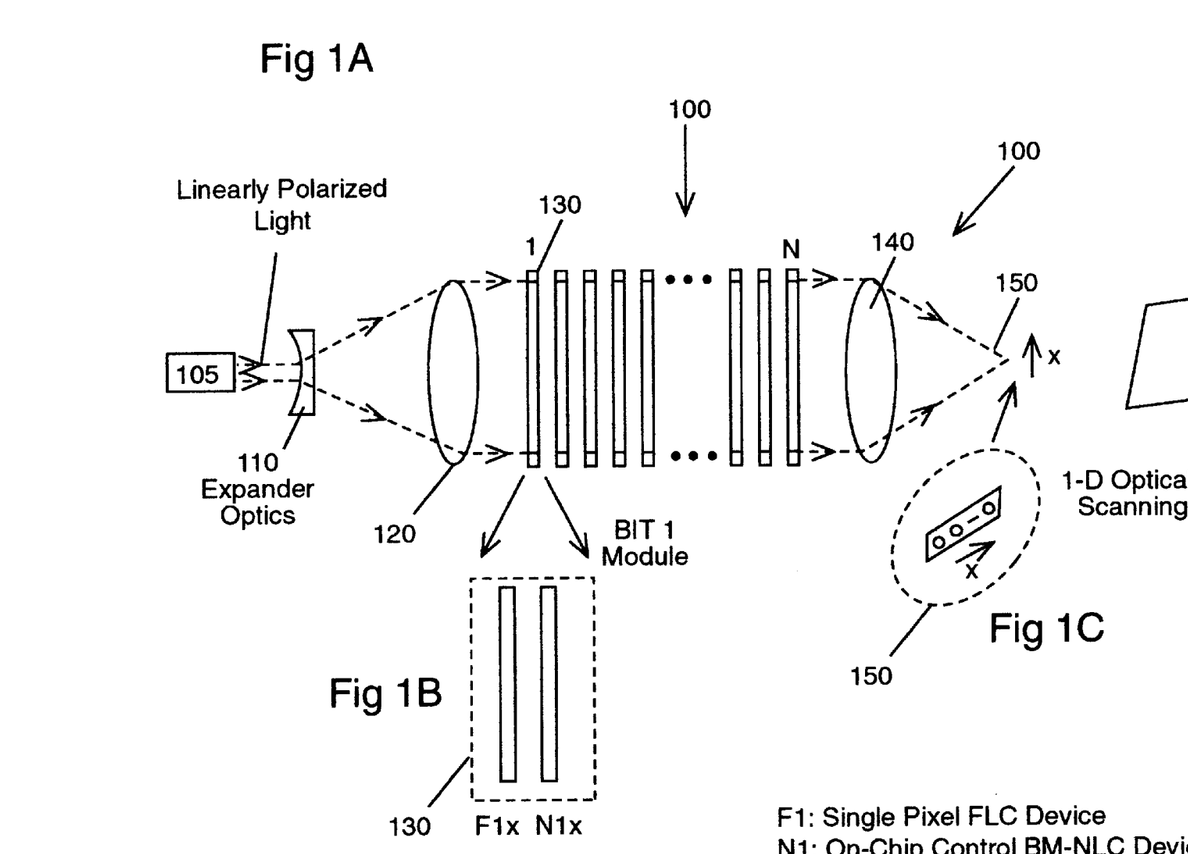
FIG. 1A is a side view of a one dimensional (1D) optical scanner and switching system.
FIG. 1B is an enlarged side view of a Bit module used the 1-D system of FIG. 1A.
FIG. 1C is view of the 1-D optical beam scanning field of FIG. 1A.

FIG. 1A is a side view of a one dimensional (ID) optical scanner and switching system 100. FIG. 1B is an enlarged side view of a Bit module 130 used the 1-D system 100 of FIG. 1A.

FIG. 1C is view of the 1-D optical beam scanning field 150 of FIG. 1A. Referring to FIG. 1A–1C, system 100 encompasses a "Binary Optical Polarization Sensitive Cascaded Architecture Network Technology", herein after referred to as BOPSCAN. A Linearly polarized light source 105, such as but not limited to a flashlight, laser, and the like, is expanded and collimated by expander optics such as a concave expander lens 110 and spherical mirror 120 for entry into the scanner 100. N planar optical modules 130 are sandwiched together to form the heart of the N-bit scanner, with a second spherical mirror 140 on the opposite side thereof between the sandwiched modules 130 and the scanning field 180. Each single bit module 130 contains active polarization switches and passive polarization sensitive beam steering optics. The terms F1 and N1 will now be described. F1 refers to a single pixel FLC device that rotates polarization by 90 degrees. N1 refers to an on-chip control BM-NLC device or birefringent plate that can be programmed to generate any desired optical wavefront.

Referring to FIGS. 1A–1C, the F1's in each module 130 are the BIT 1 fast 90 degree polarization rotators, such as but not limited to thin-film cells, made from high speed microsecond regime binary ferroelectric liquid crystal (FLC) technology. Another option is multiple quantum well device-based polarization rotators that have nanosecond response times. See H. Shen, J. Pamulapati, M. Wraback, M. Taysing-Lara, M. Dutta, H. C. Kuo, and Y. Lu, "High contrast optical modulator based on electrically tunable polarization rotation and phase retardation in uniaxially strained (100) multiple quantum wells," *IEEE Photonic Tech. Letters,* Vol. 6, No. 6 pp. 700–702, June 1994. Each FLC cell is a single pixel device that requires a single binary square wave voltage drive signal. The component labels with x,y,z subscripts relate to their specific scan directions. The N1s are BIT 1 module polarization sensitive passive or slowly programmable phase masks. For example, the N1s can deflect light for one input linear polarization while not deflecting light for the orthogonal input linear polarization. There are several options for the N1 cells. For example, if no N1 device programmability is required, N1 can be passive birefringent pre-patterned plates made from a variety of phase mask fabrication technologies such as but not limited to diffractive optic, nanooptics, photorefractive optics, thin-film optics, polymer dispersed optics, and plastic structure birefringent plates for beam deflection and focusing/defocusing functions. For example, subwavelength 1-D gratings can exhibit anisotropic behavior and synthesized effective form birefringence can be implemented. Also, general birefringent phase distributions can be made in polymer dispersed liquid crystal (PDLC) technology and photo-thermal refractive (PTR) glasses. One key feature of using these ultra-thin passive birefringent optics plates is the simplified scanner assembly and lower power scanner drive requirements that lead to overall lower scanner cost. Because of the cascaded nature of the invention scanner configuration, all antireflection (AR) coated optical devices, both active and passive, must be used to keep total losses to less than approximately 50%. Also, since all optical devices, both active and passive, are thin, less than approximately a few mm thick, the invention scanner 100 can be ultra-compact optical beam steerer of less than approximately 3 cm thick. Substrate reuse can be employed to further reduce overall scanner size.

Figures 2A, 2B, 2C:
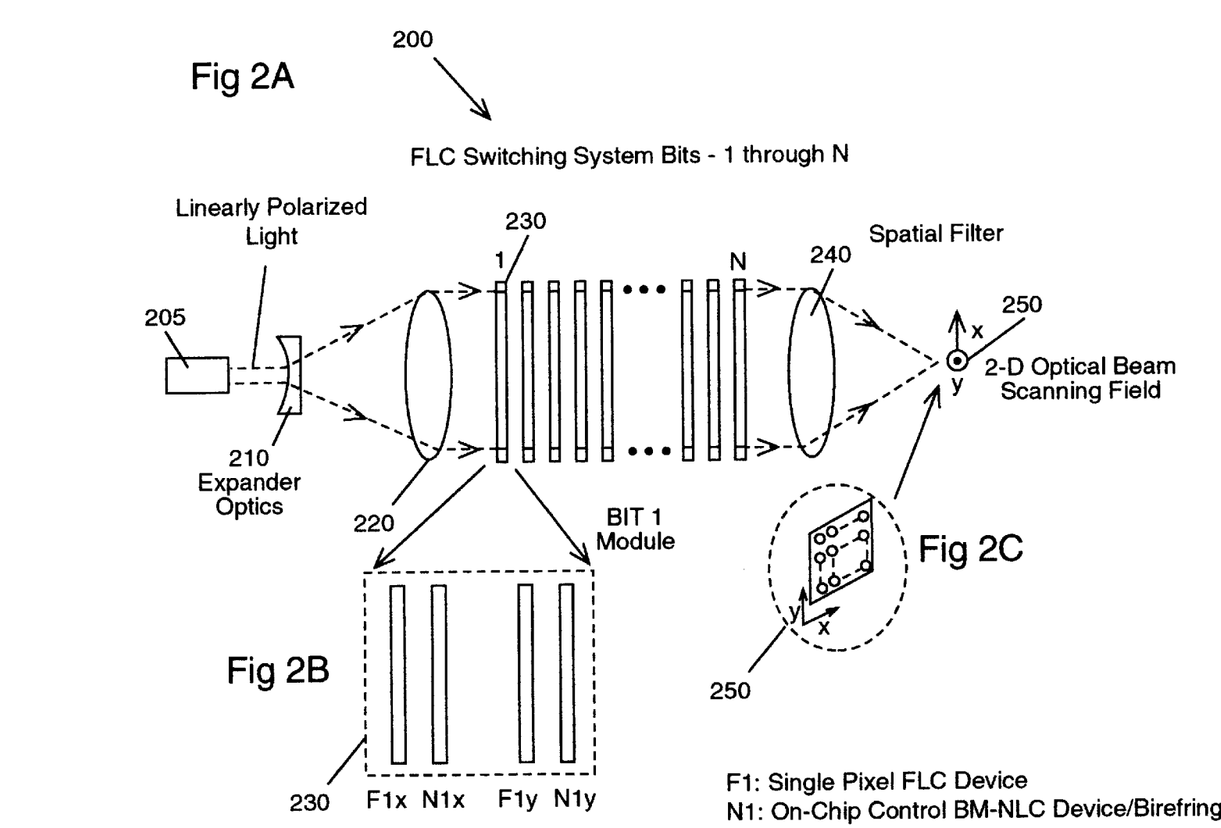
FIG. 2A is a side view of a two dimensional (2D) optical scanner and switching system.
FIG. 2B is an enlarged side view of a Bit module used the 2-D system of FIG. 2A.
FIG. 2C is view of the 2-D optical beam scanning field of FIG. 2A.

FIG. 2A is a side view of a two dimensional (2D) optical scanner and switching system 200. FIG. 2B is an enlarged side view of a Bit module 230 used the 2-D system 200 of FIG. 2A. FIG. 2C is view of the 2-D optical beam scanning field 250 of FIG. 2A. Referring to FIGS. 2A–2C, system 200 uses components 205, 210, 220, 230, 240 and 250 correspond to similar components described in reference to FIGS. 1A–1C, except for now covering 2-D (Two dimensional). The basic principle of operation of 2-D and 3-D scanners is similar to the 4-D scanner, except in the 3-D scanner, z-axis scans are made possible by using Nz's or birefringent plates that act as lenses of different focal lengths.

Figure 3A:
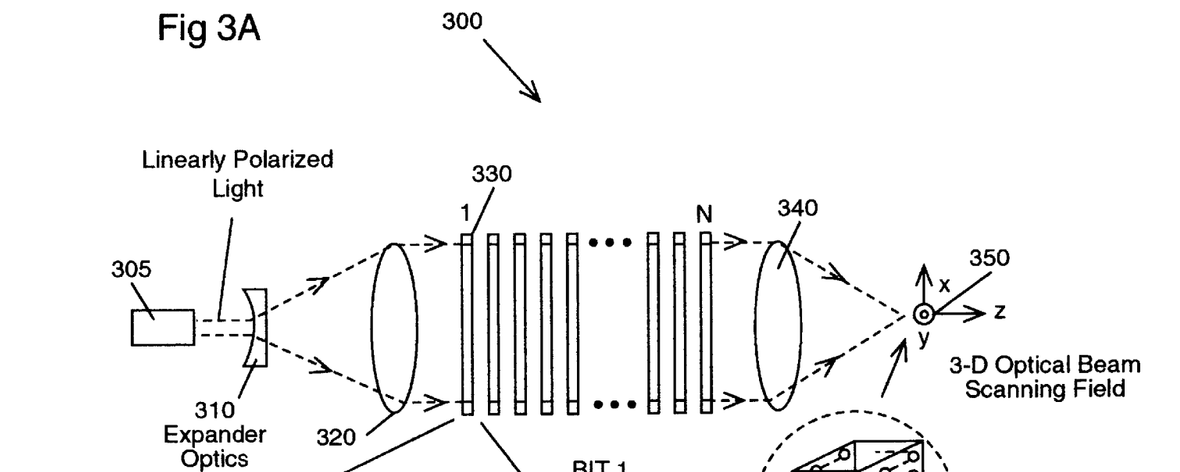
FIG. 3A is a side view of a three dimensional (3D) optical scanner and switching system.
Figure 3B:
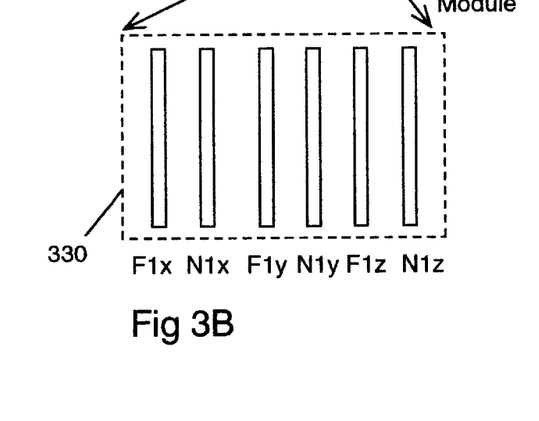
FIG. 3B is an enlarged side view of a Bit module used the 3-D system of FIG. 3A.
Figure 3C:
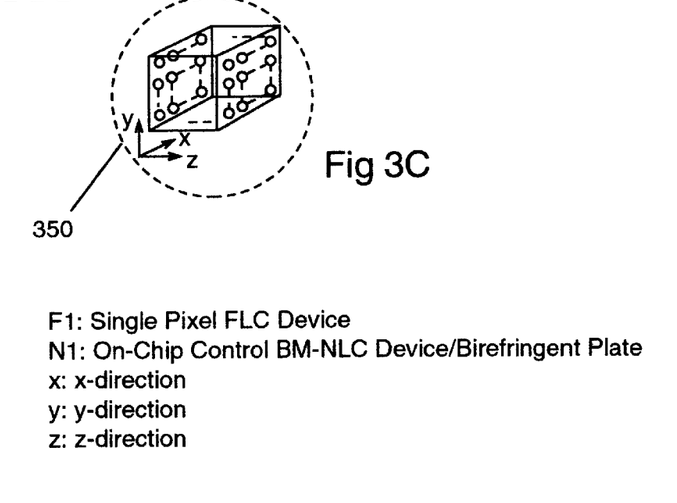
FIG. 3C is view of the 3-D optical beam scanning field of FIG. 3A.

FIG. 3A is a side view of a three dimensional (3D) optical scanner and switching system 300. FIG. 3B is an enlarged side view of a Bit module 330 used the 3-D system of FIG. 3A. FIG. 3C is view of the 3-D optical beam scanning field 350 of FIG. 2A. Referring to FIGS. 3A–3C, system 300 uses components 305, 310, 320, 330, 340 and 350 correspond to similar components described in reference to FIGS. 1A–1C & 2A–2C, except for now covering 3-D (Three dimensional).

Figure 4A:
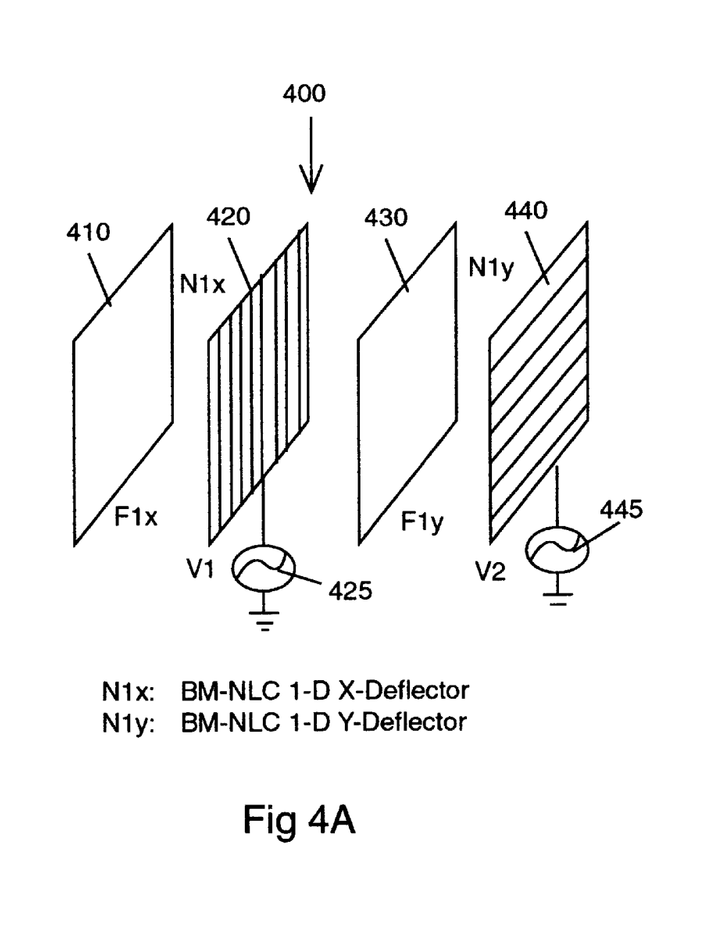
FIG. 4A shows electronically programmable fine and coarse tuning for the 2-D scan single bit module of FIG. 2A–2C, using an on-chip control electronics single voltage drive BM-NLC device.

FIG. 4A shows electronically programmable fine and coarse tuning 400 for the 2-D scan single bit module of FIG. 2A–2C, using an on-chip control electronics single voltage drive BM-NLC device. The 420 and N1y 440 can be a BM-NLC device having a hardwired on-chip control circuitry that leads to a 1–5 Volt driver 425, 445, respectively.

In each 2-D scan bit structure of the scanner, one NLC device 420, 440 acts as the variable x-deflector while the other NLC device 420, 440 acts as the variable y-deflector. The NLC devices have orthogonal molecular directors. F1x, 410 selects whether the light must acquire an x-deflection or not. F1y, 430 selects whether the light must acquire a y-deflection or not. Hence, by selecting the voltage levels of the FLC devices 410, 430 and NLC devices 420, 440, any beam deflection within the 2-D scan zone can be selected with fine and coarse tuning capabilities. For 3-D scan, two single voltage drive NLC cylindrical lens devices are added along with one F1z polarization switch.

Figure 4B:
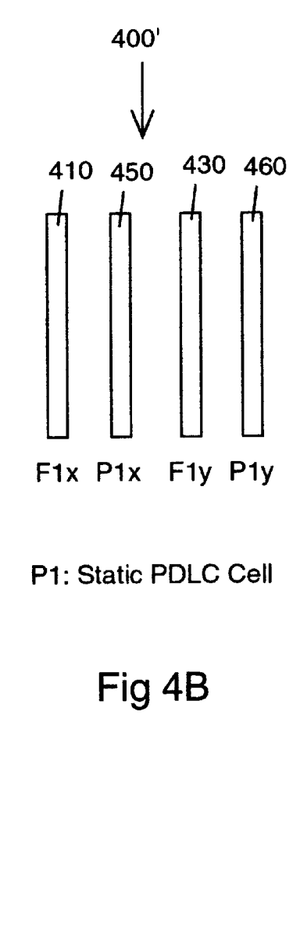
FIG. 4B shows electronically programmable fine and coarse tuning for 2-D scan single bit module of FIG. 2A–2C, using a passive or electrically inactive PDLC device.

FIG. 4B shows electronically programmable fine and coarse tuning 400' for 2-D scan single bit module of FIG. 2A–2C, using a passive PDLC device. Here, the single bit structure does not require FLC devices. Instead, fast speed (less than approximately 50 microseconds) binary, high-diffraction efficiency, Bragg-matched, polymer dispersed liquid crystal (PDLC) devices 450,460 are used. See V. P. Tondiglia, L. V. Natarajan, R. L. Sutherland,T. J. Bunning, and W. W. Adams, "Volume holographic image storage and electrooptical read out in a polymer-dispersed liquid crystal film," *Optico Letters,* Vol. 20, No. 11, Jun. 1, 1995. These PDLC devices 450,460 are orthogonally oriented with one PDLC device acting as the x-deflector and the other PDLC device acting as the y-deflector to give the 2-D scan. At present, with the application of high voltages (approximately 80 Vpeak), the PDLC Bragg grating can be essentially erased with a Bragg efficiency drop of approximately 95%.

Figure 4C:
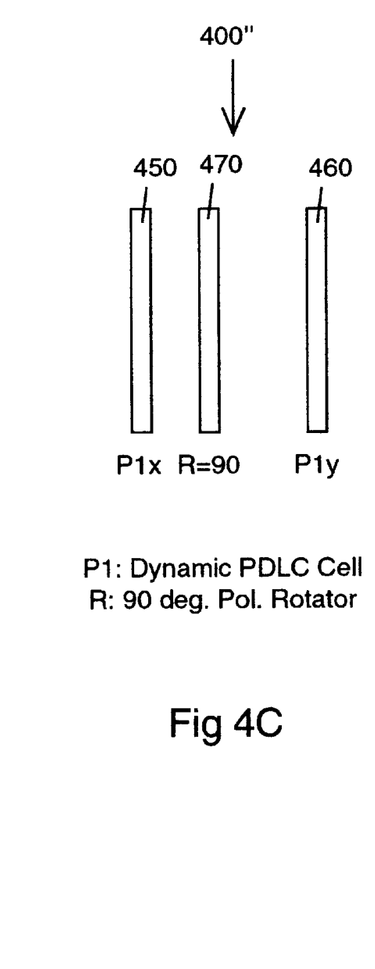
FIG. 4C shows electronically programmable fine and coarse tuning for 2-D scan single bit module of FIGS. 2A–2C, using an active or electrically driven PDLC device.

FIG. 4C shows electronically programmable fine and coarse tuning for 2-D scan single bit module of FIGS. 2A–2C, using an active PDLC device. In each bit 400', only the binary electrically controlled PDLC Bragg grating devices 450, 460 are electrically active, with a passive 90 degree polarization rotator 470 between the two PDLC devices 450, 460. These PDLC devices 450, 460 are orthogonally oriented with one PDLC device acting as the x-deflector and the other PDLC device acting as the y-deflector to give the 2-D scan. At present, with the application of high voltages (approximately 80 Vpeak), the PDLC Bragg grating can be essentially erased with a Bragg efficiency drop of approximately 95%. The key benefits of these electrooptically activated Bragg gratings in PDLCs is their large active areas and wide range of optical beam deflection angles.

Figure 5:
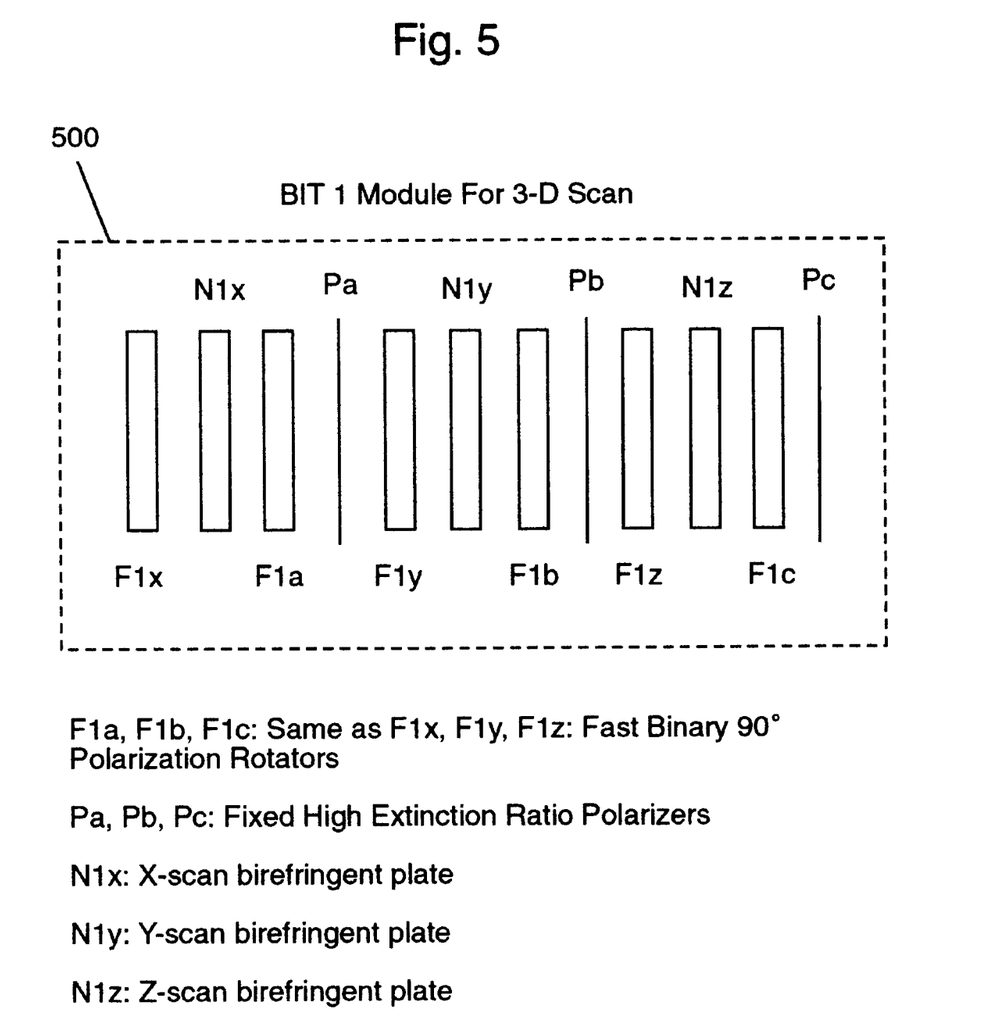
FIG. 5 shows a single 3-D bit scanner design using a polarization noise reduction technique.

FIG. 5A shows a polarization noise reduction scheme 500 that can be used for the scanner. Here, for each beamforming plate, an additional polarization switch "Fa/b/c is used with a fixed polarizer Pa/b/c to suppress unwanted light of the wrong polarization. F1a, F1b, F1c correspond the fast binary 90 degree polarization rotators described as F1x, F1y and F1z in previous figures. Pa, Pb, and Pc are fixed high extinction ratio polarizers. N1x refers to an x-scan birefringent plate. N1y refers to a y-scan birefringent plate, and N1z refers to a z-scan birefringent plate.

Figure 6A:
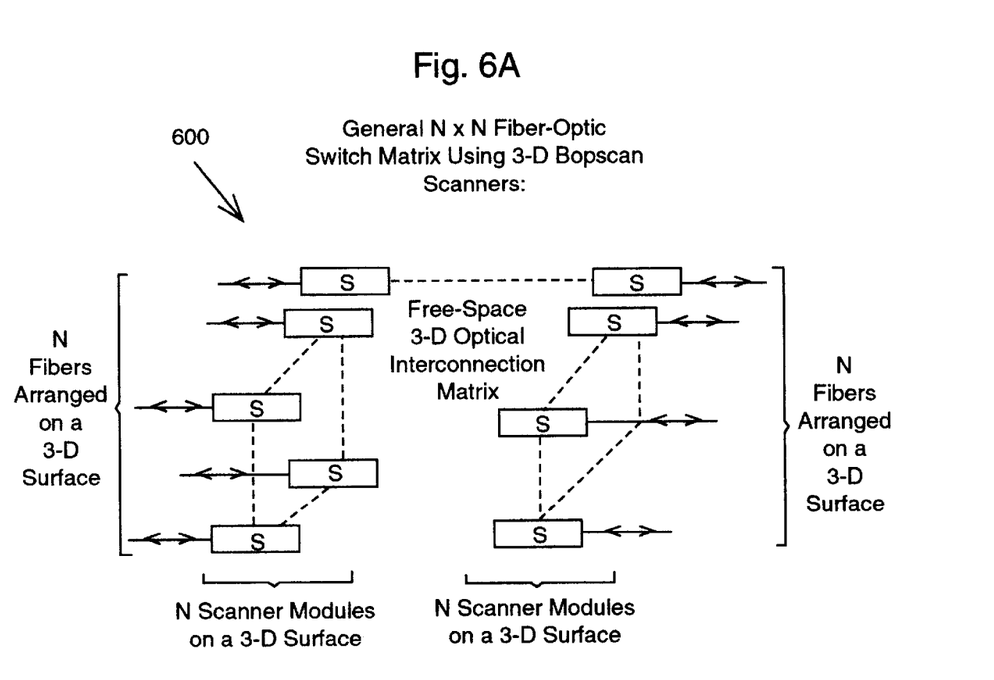
FIG. 6A shows a multiport of fiber-optic switch matrix using the 3-D BOPSCAN scanners.

FIG. 6A shows a system 600 using the 3-D BOPSCAN scanner. Here a N×N fiber-optic switch is formed. Note that for optimized fiber-optic coupling between input and output 3-D surfaces, the scanner modules S must be set for the right angles and beam focusing plates so as to minimize loss. Because each fiber has its own position on the 3-D surface, each scanner needs its own independent setting for correct fiber light coupling.

Figure 6B:
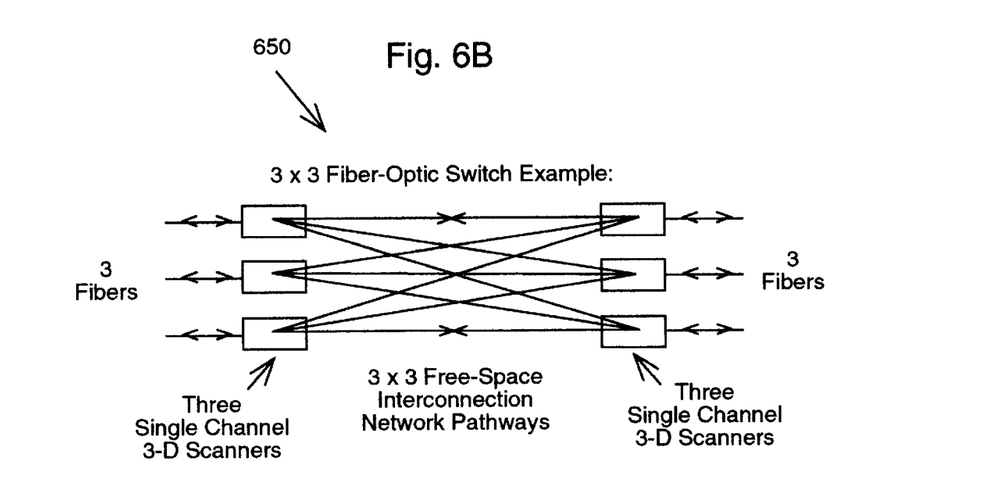
FIG. 6B shows an example of a 3×3 fiber-optic switch matrix using 6 single channel 3-D BOPSCAN scanners.

FIG. 6B shows a 3×3 switch 650 showing the different angles and lengths of the interconnection light paths that are compensated by the scanner pair per path at the edges of the switch structure.

Figure 7:
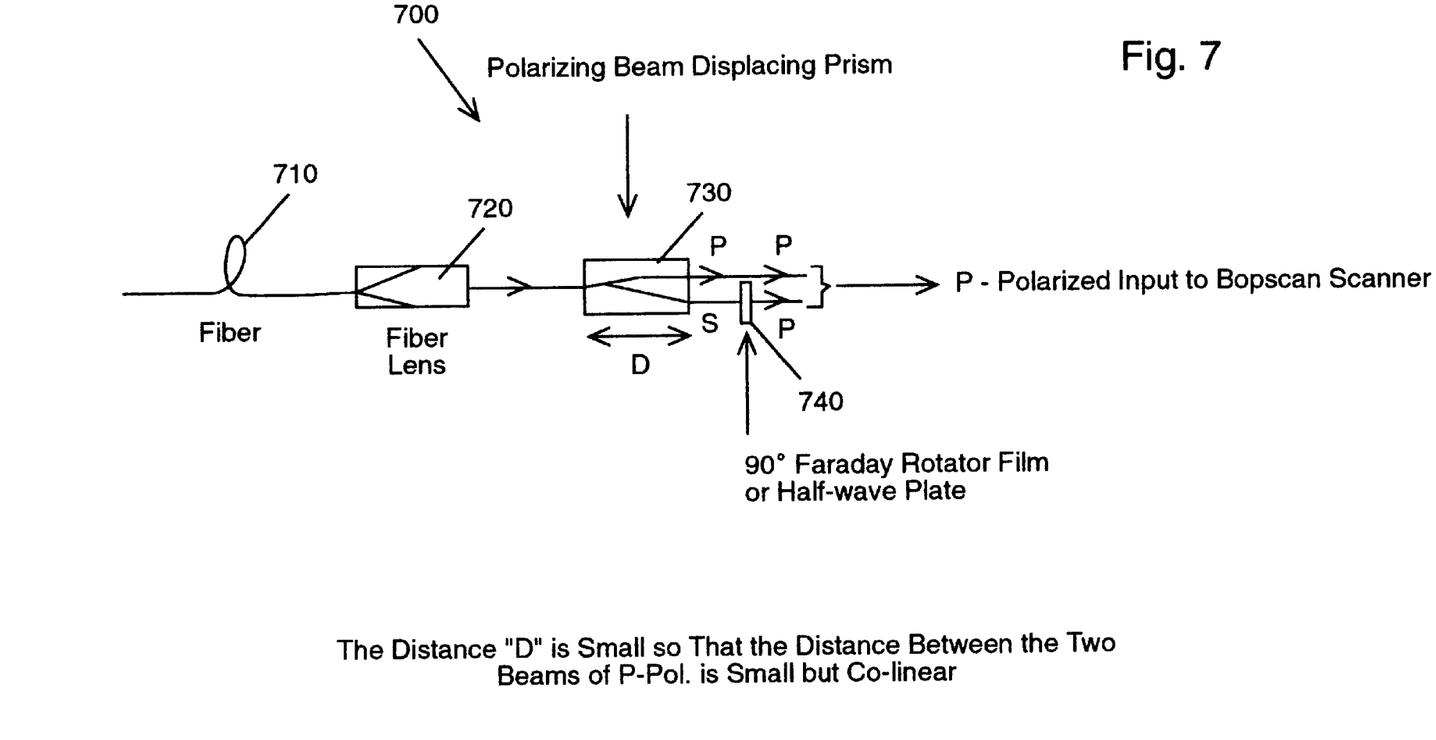
FIG. 7 shows the use of polarization diversity techniques to make the BOPSCAN scanner polarization independent.

FIG. 7 shows the use 700 of polarization diversity techniques to make the BOPSCAN scanner polarization independent. Light passes through fiber 710 through fiber lens 710 to polarizaing beam displacing prism 730, where a 90 degree faraday rotator film 740 or half-wave plate 740 forms polarized light input to the BOPSCAN Scanner previously described. The distance D in the displacing prism is small enough so that the distance between the two beams of p-pol is small but collinear.

It is important to note that the LEGO™ style cascaded nature of the subject invention scanner allows for the liberty of inserting spatial filters at various stages so as to clean the light to be transmitted via the output port.

If the spatially coherent light input in the subject invention scanners is not linearly polarized, the input orthogonal polarizations can be separately processed by two parallel structures or a two channel BOPSCAN scanner.

An additional option is to convert input light to one linear polarization and then process by one structure, as shown in FIG. 7A where light from an optical fiber enters a fiber lens and a polarizing beam displacing prism to form two beams. The s-polarized beam is then converted to a p-polarized beam. Hence, light of linear polarization enters the scanner, as needed.

The invention has applicability for displays, storage and bar code readers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A non-mechanical 3D(three-dimensional) inertialess optical scanner that can rapidly and efficiently scan a volume spacing of approximately 1 (one) billion points, comprising:
   means for forming a linearly polarized light source; and
   means for optically scanning an optical field with the light source in three(x,y and z) directions using binary switchable cascaded control modules.

2. The non-mechanical 3D(three-dimensional) inertialess optical scanner of claim 1, wherein the means for scanning includes:
   a first control means having binary switchable cascaded N-bit modules for controlling the optical scanning of the optical field in a x direction;
   a second control means having a binary switchable cascaded N-bit modules for controlling the optical scanning of the optical field in a y direction; and
   a third control means having a binary switchable cascaded N-bit modules for controlling the optical scanning of the optical field in a z direction, wherein the first control means, the second control means and the third control means scan approximately a billion points.

3. The non-mechanical 3D inertialess optical scanner of claim 2, wherein the first control modules, the second control modules and the third control modules, each include:
   2N optical states, wherein N=10 bits.

4. The non-mechanical 3D inertialess optical scanner of claim 2, wherein the first control modules, the second control modules and the third control modules, each include:
   10 binary optical switching modules for a total of 30 binary switching modules.

5. The non-mechanical 3D inertialess optical scanner of claim 4, wherein each binary switching module includes:
   active polarization switch means;
   passive beam steering means.

6. The non-mechanical 3D inertialess optical scanner of claim 5, wherein the polarization switch means includes:
   ferroelectric liquid crystal(FLC) polarization rotator.

7. The non-mechanical 3D inertialess optical scanner of claim 5, wherein the polarization switch means includes:
   multiple quantum well(mqw) polarization rotator.

8. The non-mechanical 3D inertialess optical scanner of claim 5, wherein the polarization switch means includes:
   nematic liquid crystal(NLC) polarization rotator.

9. The non-mechanical 3D inertialess optical scanner of claim 5, wherein the beam steering means includes;
   a birefringent plate.

10. The non-mechanical 3D inertialess optical scanner of claim 9, wherein the birefringent plate includes:
    birefringent mode nematic liquid crystal(BM-NLC).

11. The non-mechanical 3D inertialess optical scanner of claim 9, wherein the birefringent plate includes: diffractive optical elements(DOEs).

12. The non-mechanical 3D inertialess optical scanner of claim 9, wherein the birefringent plate includes:

polymer dispensed liquid crystals(PDLCs).

13. The non-mechanical 3D inertialess optical scanner of claim 9, wherein the birefringent plate includes:
   computer generated birefringent nanoscale fabricated structure.

14. The non-mechanical 3D(three-dimensional) inertialess optical scanner of claim 1, further includes:
   an expander concave lens and a spherical lens for expanding and collimating the linear light source into the optical scanning means.

15. The non-mechanical 3D(three-dimensional) inertialess optical scanner of claim 14, further includes:
   a second spherical lens between the optical scanning means and the optical field.

16. The non-mechanical 3D(three-dimensional) inertialess optical scanner of claim 1, wherein the optical scanner is used for:
   a multiport in a fiber-optic switch matrix.

17. A non-mechanical 1D(one-dimensional) inertialess optical scanner that can rapidly and efficiently scan a volume spacing of approximately 1(one) thousand points, comprising:
   means for forming a linearly polarized light source; and
   means for optically scanning an optical field with the light source in the x-direction using binary switchable cascaded control modules.

18. The non-mechanical 1D(one-dimensional) inertialess optical scanner of claim 17, wherein the means for scanning includes:
   a first control means having binary switchable cascaded N-bit modules for controlling the optical scanning of the optical field in a x direction, wherein the first control means scan approximately a thousand points.

19. A non-mechanical 2D(two-dimensional) inertialess optical scanner that can rapidly and efficiently scan a volume spacing of approximately 1 (one) million points, comprising:
   means for forming a linearly polarized light source; and
   means for optically scanning an optical field with the light source in two(x and y) directions using binary switchable cascaded control modules.

20. The non-mechanical 2D(two-dimensional) inertialess optical scanner of claim 19, wherein the means for scanning includes:
   a first control means having binary switchable cascaded N-bit modules for controlling the optical scanning of the optical field in a x direction; and
   a second control means having a binary switchable cascaded N-bit modules for controlling the optical scanning of the optical field in a y direction, wherein the first control means and the second control means scan approximately a million points.

* * * * *